United States Patent [19]

Mookerjee

[11] Patent Number: 4,558,681
[45] Date of Patent: Dec. 17, 1985

[54] EXHAUST GAS AND BLOW-BY RECIRCULATION SYSTEM FOR AN INTERNAL COMBUSTION ENGINE

[75] Inventor: Bhaskar Mookerjee, Peoria, Ill.

[73] Assignee: Caterpillar Tractor Co., Peoria, Ill.

[21] Appl. No.: 611,442

[22] Filed: May 17, 1984

[51] Int. Cl.$^4$ .............................................. F02M 25/06
[52] U.S. Cl. ..................................... 123/568; 123/572
[58] Field of Search ............... 123/568, 572, 573, 574; 285/189, 192, 205, 208, 337; 403/197

[56] References Cited

U.S. PATENT DOCUMENTS

| | | | |
|---|---|---|---|
| 3,116,727 | 1/1964 | Dietrich | 123/572 |
| 3,166,062 | 1/1965 | Yerman | 123/572 |
| 3,186,392 | 6/1965 | Gregoric | 123/572 X |
| 3,256,871 | 6/1966 | Bintz et al. | 123/572 |
| 3,620,197 | 11/1971 | Albright et al. | 123/39 |
| 3,846,980 | 11/1974 | DePalma | 123/572 X |
| 4,020,809 | 5/1977 | Kern et al. | 123/569 |
| 4,112,892 | 9/1978 | Lindberg | 123/572 X |
| 4,363,310 | 12/1982 | Thurston | 123/572 |

Primary Examiner—Parshotam S. Lall
Assistant Examiner—W. R. Wolfe
Attorney, Agent, or Firm—Larry G. Cain

[57] ABSTRACT

Systems have been used to combine exhaust gas and blow-by for internal combustion engines. The mixing of the oily blow-by and the exhaust, however, has caused carbon particles to cake within the walls of intake passages and near intake valves. The subject exhaust gas and blow-by recirculation system overcomes this deficiency by inducing the oily blow-by within a passage of a cylinder head. The passage is located in close proximity to one of the plurality of combustion chambers such that the high velocity or flow rate of the intake air reduces the time and effect of the reaction between the hot exhaust gas and the oily blow-by. The subject exhaust gas and blow-by system utilizes a director tube extending through a bore of the cylinder head. The director tube is orientated to enable the flow of blow-by to enter the intake air in line with the flow path.

9 Claims, 4 Drawing Figures

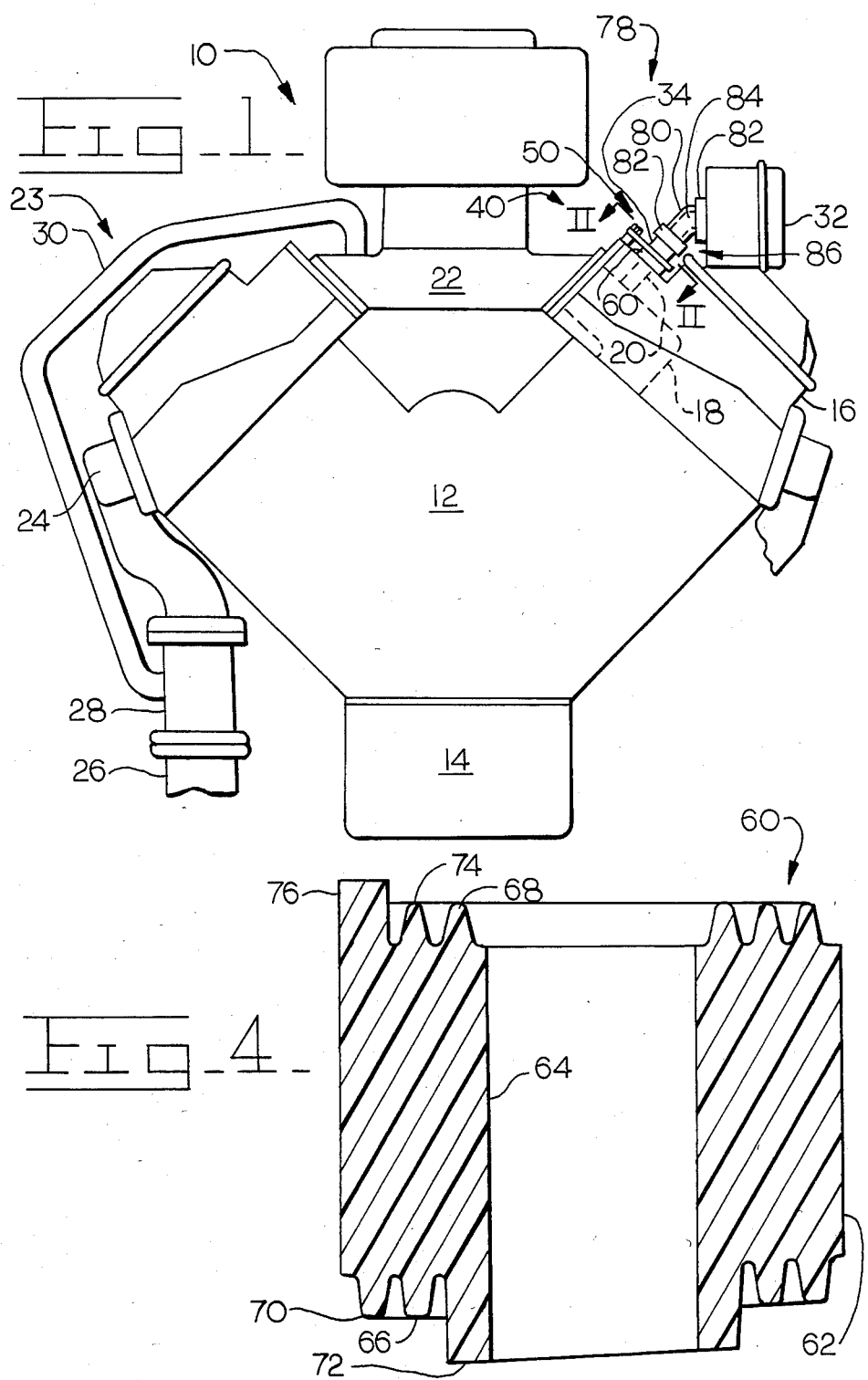

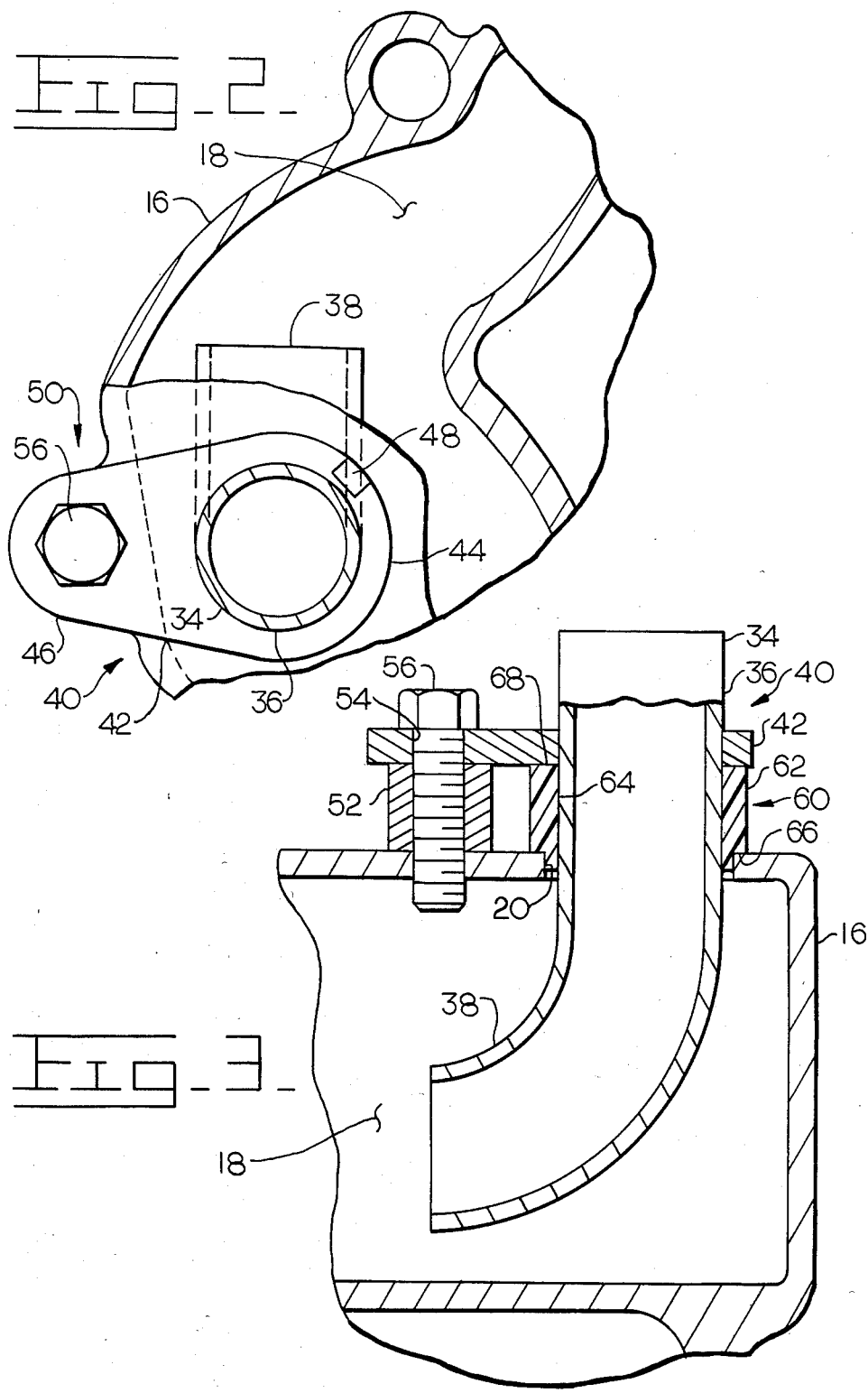

EXHAUST GAS AND BLOW-BY RECIRCULATION SYSTEM FOR AN INTERNAL COMBUSTION ENGINE

DESCRIPTION

1. Technical Field

This invention relates generally to engines and more particularly to recirculating of blow-by gases and a portion of the exhaust gas into the combustion system of the engine for reducing the pollution emitted from the engine. Generally the engine is a naturally aspirated version of an internal combustion engine.

2. Background Art

The burning of hydrocarbon fuels in engines causes the engines to emit oxides of nitrogen (NOx) and soot as a by-product of the combustion cycle. These particles are emitted through the exhaust system. Many systems have been developed for recycling a portion of the exhaust gas through the engine thereby reducing the emission of these components into the atmosphere. The same engine also produces blow-by gases which escape past the piston rings and into the crankcase. The blow-by gases include unburned carbon which becomes coated with oil from the crankcase. Blow-by gases are recycled to the intake manifold where they are mixed with incoming air and ingested into the engine combustion system. The recirculation of a portion of exhaust gas and blow-by is used to reduce pollutions emitted to the atmosphere. The combination of the hot exhaust gas and the oily carbon particles of the blow-by if left together over a period of time causes a negative reaction which can result in the engine malfunctioning. The heat of the exhaust will cause the oily carbon to cake along the walls of the intake passages and near the intake valves. The caking near the valves will cause the valve seat to overheat and crack resulting in oil leakage past the seat and into the intake passage. Such oil compounds the caking problem by combining with the caking mixture forming a build-up which becomes excessive to the point where the engine malfunctions.

The present invention is directed to overcoming one or more of the problems as set forth above.

DISCLOSURE OF THE INVENTION

In one aspect of the present invention an exhaust gas and blow-by recirculation system for an internal combustion engine is disclosed. The engine includes a crankcase and a cylinder head which has an intake passage. Also included with the engine is an intake manifold connected to the passage, means for directing a portion of the engine exhaust into the intake manifold, and a crankcase ventilation valve in communication with the crankcase. The improvement of the recirculation system is comprised of means for communicating the blow-by gases from the crankcase to the passage in the cylinder head through the crankcase ventilation valve.

The invention as decribed above overcomes the caking of the oily carbon particles along the walls of the intake passages and enables the exhaust gases to be recirculated reducing oxides of nitrogen and prevents the caking problem as discussed earlier.

BRIEF DESCRIPTION OF THE DRAWINGS

FIG. 1 is a front elevational view of an internal combustion engine embodying the exhaust gas and blow-by recirculation system of this invention;

FIG. 2 is a partial sectional view disclosing a portion of the exhaust gas and blow-by recirculation system;

FIG. 3 is a sectional view through the cylinder head disclosing a portion of the exhaust gas and blow-by recirculation system; and FIG. 4 is a sectional view of the sealing means shown in a nonassembled condition.

BEST MODE FOR CARRYING OUT THE INVENTION

In reference to FIG. 1, an exhaust gas and blow-by recirculation system 10 for an internal combustion engine 12 is shown. Although the engine 10, as shown, is a naturally aspirated internal combustion engine, the scope of the invention should not be limited to this configuration. The engine 10 has a crankcase 14 and a cylinder head 16. The cylinder head 16 has an air intake passage 18 for transmitting combustible air into one of a plurality of combustion chambers, and a bore 20 entering the passage 18. Also shown is an intake manifold 22 connected to the passage 18 and a means 23 for directing a portion of the engine exhaust into the intake manifold. The means 23 includes an exhaust manifold 24 connected to the cylinder head 16, an exhaust pipe 26, a valve mechanism 28 of conventional construction is disposed between the exhaust manifold 24 and the exhaust pipe 26. Also included with the means 23 is a tube 30 connects the valve mechanism 28 with the intake manifold 22. A crankcase ventilation valve 32 is in communication with the crankcase 14 as is well known in the art.

As shown in FIG. 3, a director tube 34 has a straight portion 36 and a curved portion 38. The straight portion 36 is located partially outside the cylinder head 16 and extends through the bore 20 in the cylinder head 16. The curved portion 38 is located within the passage 18 and is oriented to direct the flow of blow-by in the same direction and into the fluid stream within the cylinder head 16.

As shown in FIGS. 2 and 3, a fastening means 40 is rigidly connected to the director tube 34 and orientates the tube in line with the intake air flow. The fastening means 40 includes a strap 42 rigidly connected to the director tube 34. The strap 42 has an end 44 and a notch 48 located on the end 44 of the strap 42. A securing means 50 includes a tubular spacer 52 located between the strap 42 and the cylinder head 16, a bore 54 in the strap 42 and a bolt 56 extends through the bore 54 and spacer 52.

A means 60 for sealing is provided between the director tube 34 and the cylinder head 16 as shown in FIG. 3. The means 60 includes a seal 62 which has a bore 64 sealably fitted around the director tube 34. A first sealing surface 66 contacts the cylinder head 16 and a second sealing surface 68 contacts the fastening means 40. As shown in FIG. 4, the first sealing surface 66 has a plurality of annular concentric protrusions 70 thereon. A concentric extension 72 is longer than the protrusions and extends between the bore 20 and the director tube 34. The first sealing surface 66 is at an angle of substantially 3° to the second surface 68. The top surface of the cylinder head 16 has a cast surface which has a taper of approximately 3° required by conventional casting techniques. The relationship of the 3° angles of the cylinder head 16 and the sealing surface 66 are orientated by a tab 76 protruding from the second surface 68 and fitting within the notch 48 in the strap 42.

A means 78 for connecting the director tube 34 to the crankcase ventilation valve 32 is shown in FIG. 1. The means 78 includes a tube 80, positioned between the director tube 34 and the crankcase ventilation valve 32, and a plurality of couplings 82. The couplings 82 attach the end portions of the formed tube 80 with the valve 32 and the director tube 34 forming a sealed passage 84 between the valve 32 and the director tube 34. Also shown in FIG. 1 is a means 86 for communicating the blow-by gases from the crankcase 14 to the passage 18 in the cylinder head 16 through the crankcase ventilation valve 32. The means 86 for communicating includes the bore 20, the director tube 34, means 40 for fastening the director tube 34 to the cylinder head 16, means 60 for sealing between the director tube 34 and the cylinder head 16 and means 78 for connecting the director tube 34 to the crankcase ventilation valve 32.

INDUSTRIAL APPLICABILITY

The exhaust gas and blow-by recirculation system 10 for the internal combustion engine 12 reduces the pollution emitted from the engine 12. The exhaust gases emitted from the engine 12 pass through the exhaust manifold 24 to the valve mechanism 28 connected between the exhaust manifold 24 and the exhaust pipe 26. The valve mechanism 28 directs a portion of the exhaust through the tube 30 and into the intake manifold 22 at a location away from the passage 18. Inside the intake manifold 22 the exhaust gases are combined with intake air and directed into the combustion chambers through the cylinder head.

The blow-by is collected in the crankcase 14 of the engine 12. From the crankcase 14, the blow-by enters the crankcase ventilation valve 32. The blow-by passes through the formed tube 78 and into the director tube 34. The director tube 34 is positioned within the passage 18 of the cylinder head 16 in such a manner so that the stream of blow-by is in line with the fluid flow going into the engine combustion chamber. The air entering the combustion chamber from the intake manifold 22 passes by the director tube 34 and into the combustion chamber. The director tube 34 orientates the flow of the blow-by in the same direction as the flow of the intake air. The director tube 34 reduces the size of the passage and increases the velocity of the air flowing around the tube 34 in the passage. The velocity of the air within the passage 18 is therefore high and reduces the time for mixing of the blow-by with the intake and exhaust mixture. The mixture is drawn directly into the combustion chamber preventing the caking of the oily blow-by and hot exhaust along the walls of the passage 18.

With the invention as disclosed above, the exhaust gas and blow-by recirculation system 10 reduces the amount of pollution added to the atmosphere and prevents the build-up and caking of materials within the engine 12. The caking within the intake passage is prevented by locating the blow-by inlet or director tube 34 within the passage 18 of the cylinder head 16. Since the passage 18 is located in close proximity to one of the plurality of combustion chambers, the caking near the valves is reduced because of the high velocity with which the incoming air within the passage 18 is traveling. This high velocity reduces the time that the mixture of hot exhaust and oily blow-by resides along the walls of the passages 18 thereby preventing caking.

Other aspects, objects and advantages will become apparent from a study of the specification, drawings and appended claims.

I claim:

1. An exhaust gas and blow-by recirculation system for an internal combustion engine, said engine including a crankcase, a combustion chamber, a cylinder head having an air intake passage connected to the combustion chamber and an intake manifold connected to said passage at an end away from the combustion chamber and a crankcase ventilation valve in communication with the crankcase, the improvement comprising:
   a bore entering said air intake passage;
   means for directing a portion of the engine exhaust into the intake manifold;
   a director tube extending through the bore of the cylinder head and into the passage of the cylinder head;
   means for sealing between the director tube and the cylinder head;
   means for fastening the director tube to the cylinder head; and
   means for connecting said director tube to said crankcase ventilation valve.

2. An exhaust gas and blow-by recirculation system for an internal combustion engine, said engine including a crankcase, a combustion chamber, a cylinder head having an air intake passage connected to the combustion chamber, an intake manifold connected to said passage at an end remote from the combustion chamber, and a crankcase ventilation valve, the improvement comprising:
   means for directing a portion of the engine exhaust into the intake manifold; and
   means for communicating the blow-by gases from said crankcase to said passage in the cylinder head through the crankcase ventilation valve, said communicating means including a bore in the cylinder head through which blow-by is communicated directly into the passage.

3. The exhaust gas and blow-by recirculation system of claim 2 wherein said engine is a naturally aspirated engine.

4. An exhaust gas and blow-by recirculation system for an internal combustion engine, said engine including a crankcase, a cylinder head having an air intake passage, an intake manifold connected to said passage, and a crankcase ventilation valve in communication with the crankcase ventilation valve in communication with the crankcase, the improvement comprising:
   a bore entering said air intake passage;
   means for directing a portion of the engine exhaust into the intake manifold;
   a director tube extending through the bore of the cylinder head and into the passage of the cylinder head, said director tube including a curved portion, said curved portion being located within the passage;
   means for sealing between the director tube and the cylinder head;
   means for fastening the director tube to the cylinder head; said fastening means including a strap rigidly connected to the tube and means for securing the strap to the cylinder head so that the curved portion of the tube is oriented in line with the flow of the intake air; and
   means for connecting said director tube to said crankcase ventilation valve.

5. The exhaust gas and blow-by recirculation system of claim 4, wherein the securing means includes a tubular spacer located between the strap and the cylinder head, a bore in the strap, and a bolt extending through the bore and spacer.

6. The exhaust gas and blow-by recirculation system of claim 4 wherein said sealing means includes a seal having a bore sealably fitted around the director tube, a first sealing surface in sealing contact with the cylinder head and a second sealing surface in sealing contact with the fastening means.

7. The exhaust gas and blow-by recirculation system of claim 4, wherein said strap has an end and a notch located on the end;
    said sealing means includes a seal having a bore therein sealably fitted around the director tube, a first and second sealing surface, said first surface being at an angle of substantially 3° to said second surface, and said second surface having a tab protruding therefrom and into the notch in the strap.

8. The sealing means of claim 7, wherein said first sealing surface includes a plurality of annular concentric protrusions and concentric extension extending into the bore between the cylinder head and the director tube.

9. The sealing means of claim 7, wherein said second sealing surface includes a plurality of annular concentric protrusions thereon.

* * * * *